May 24, 1966 T. L. FAUL 3,253,136
NAVIGATION LIGHT FOR BOATS
Filed Dec. 2, 1963
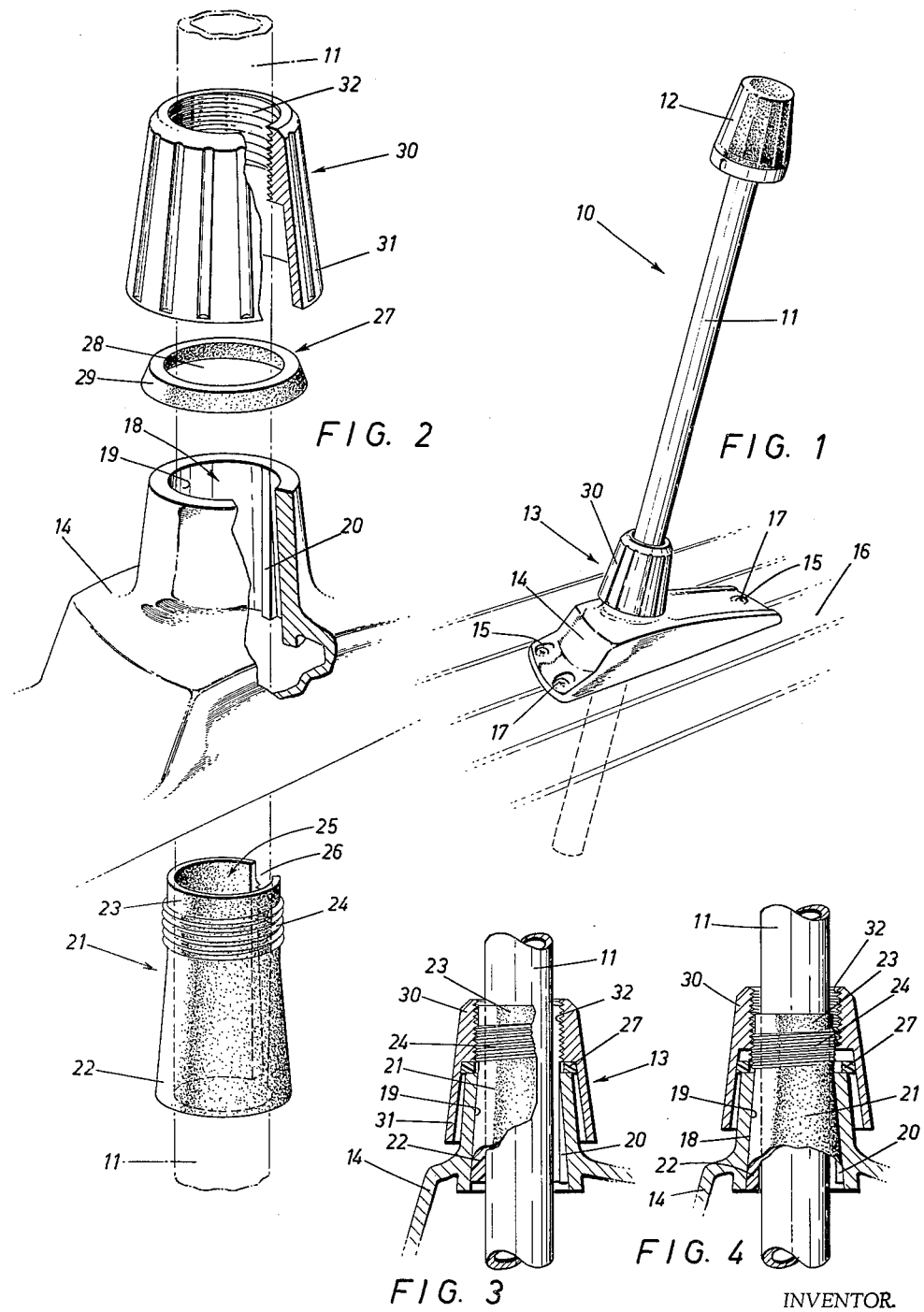
INVENTOR.
Thomas L. Faul
BY
Attorney

United States Patent Office 3,253,136
Patented May 24, 1966

3,253,136
NAVIGATION LIGHT FOR BOATS
Thomas L. Faul, Skaneateles, N.Y., assignor to Aqua-Marine Mfg. Limited, Toronto, Ontario, Canada
Filed Dec. 2, 1963, Ser. No. 327,446
2 Claims. (Cl. 240—7.5)

This invention relates to a navigation light for boats. More particularly, this invention relates to a navigation light for boats which includes a holder that is adapted to permit ready adjustments to be made in the position of a member of generally circular cross-section held therein, the holder being particularly suited for firmly holding such a member in position even though the whole navigation light be subjected to constant vibrations.

A conventional stern light of small pleasure crafts includes a post, which may be a rod, tube or the like having a smooth metal surface. Such a stern light generally is provided with a holder of a type that will permit ready adjustments to be made in the position of the tube in the holder. Many types of holders have been used in the past but most of these require the provision of a fastening device of the screw-threaded type which must remain tight in order that the tube be held firmly in position, while others are relatively complex in nature, expensive to manufacture and do not permit ready adjustment of the tube in the holder. Some such holders even require the provision of special tools to engage and disengage the holder from the tube.

Accordingly, it is an object of this invention to provide a navigation light for boats incorporating means for holding a member of generally circular cross-section, such as a rod, tube, or the like, in position, which means are simple in nature, relatively inexpensive, able to permit ready adjustments to be made in the position of the member in the holding means without the use of hand-tools, and which do not depend upon a screw-cap or the like remaining tight in order that the member be held in position, and hence which can be used successfully even under conditions where vibration is likely to loosen such a screw-cap.

In brief, this invention relates to a navigation light for boats incorporating means for holding the lamp-carrying post of the navigation light in position, and for permitting adjustments to be made in the position of the post, these means comprising a bracket adapted to be mounted on a boat and having an opening of tapered cross-section extending therethrough, the opening being defined by tapered side walls. The bracket includes an upstanding neck through which the opening extends. A bushing is mounted in the opening and is slidable therein to a limited extent in one direction parallel to the longitudinal axis of the opening. The bushing has an outer surface, a part of which conforms to and is engageable with the tapered side walls of the opening. An opening of generally circular cross-section extends through the bushing in the same general direction as the opening in the bracket. The post is mounted within the bushing and extends through the opening therein. The bushing has a slot therein which extends from the aforementioned part of the outer surface into the opening passing through the bushing and which extends from one end of the bushing towards the other end thereof, this slot being tapered. Means such as a screw cap is threadably engageable with a threaded neck of the bushing and is adapted to draw the part of the outer surface thereof into tight engagement with the tapered side-walls by moving the bushing in the aforementioned one direction, whereby the width of at least a part of the slot in the bushing is decreased and the bushing is adapted to be drawn into tight gripping engagement with the member. The cap includes a skirt portion which extends over the aforementioned neck of the bracket.

This invention will become more apparent from the following detailed description, taken in conjunction with the appended drawings, in which:

FIGURE 1 is a perspective view of a navigation light embodying this invention;

FIGURE 2 is a more detailed perspective view of the holder shown in FIGURE 1, the parts thereof being exploded for clarity;

FIGURE 3 is a section through the holder of FIGURES 1 and 2 showing the holder in gripping position; and FIGURE 4 is a view similar to FIGURE 3 but showing the holder in non-gripping position with respect to the tubular member extending therethrough.

Referring now to the drawings, there is shown a navigation light 10 which comprises a tube 11 of circular cross-section, the tube being made of any standard metal and having a smooth chromium plated surface, a lens 12 mounted in any suitable way on tube 11 and having a light bulb (not shown) therein, and a holder 13. Tube 11 is, of course, hollow, as best shown in FIGURES 2, 3 and 4, to accommodate the electrical conductors which supply electrical energy to the light bulb in lens 12.

As best shown in FIGURES 2, 3 and 4, holder 13 includes a bracket 14 having apertures 15 (FIGURE 1) extending therethrough to permit mounting of bracket 14 on the deck 16 (FIGURE 1) of a boat by means of screws 17, for example. Bracket 14, which also may be made of any suitable chromium plated metal, has an upstanding neck and also an opening 18 extending therethrough which is of tapered cross-section and which is defined by tapered side walls 19, opening 18 tapering inwardly from the bottom to the top thereof. Extending inwardly into opening 18 from side walls 19 is a key 20 which is formed integral with bracket 14.

Mounted in opening 18 there is a bushing 21 which has a skirt portion 22, the outer surface of which is tapered to conform with tapered side walls 19. Formed integral with skirt 22 is a part 23 of bushing 21 which is of generally tubular configuration and which has screw threads 24 thereon. As best shown in FIGURES 3 and 4, tubular part 23 of bushing 21 extends beyond opening 18. Bushing 21 has an opening 25 extending therethrough in the same direction as opening 18, opening 25 being of circular cross-section and of only slightly larger diameter than the diameter of tube 11. There also is provided in bushing 21 a slot 26 which extends from the outer surface of bushing 21 into opening 25 and which extends from one end of the bushing to the other, as best shown in FIGURE 2. It will be seen that slot 26 is tapered, being narrower at the bottom end of bushing 21 than at the top end thereof. Bushing 21 is made of any suitable plastic material such as nylon, for example, which is non-corrosive in fresh or sea water.

Holder 13 also includes a washer 27 which may be made of nylon, for example. Washer 27 has a circular opening 28 therein and a surface 29 which is tapered.

Holder 13 additionally includes a screw-cap 30 which has an outwardly flared skirt portion 31 that, as shown in FIGURES 3 and 4, is spaced apart from the neck of bracket 14. Screw-cap 30 has a circular opening therein with the side walls defining the opening being threaded as at 32.

In order to assemble a navigation light embodying this invention, bushing 21 is inserted into opening 18 and assumes the position shown in FIGURE 4. The insertion of bushing 21 in opening 18 is accomplished by inserting the top end 23 of bushing 21 into the larger diameter end of opening 18 with key 20 extending into slot 26, and by pushing bushing 21 upwardly to the position shown in FIGURE 4. In order to remove bushing 21 from bracket 14, part 23 is squeezed, thereby reducing the diameter thereof and permitting the bushing to be pushed downwardly in bracket 14. It is to facilitate the insertion of bushing 21 into opening 18 and the removal of bushing 21 from bracket 14, that slot 26 is made wider at the top than at the bottom thereof. After bushing 21 has been so assembled in bracket 14, tube 11 is pushed through opening 25 in bushing 21, washer 27 and screw-cap 30 previously having been mounted on tube 11 as best shown in FIGURE 2.

After the foregoing assembly has been completed, tube 11 is adjusted in position in bracket 14 so that lens 12 is at the desired height. Screw-cap 30 then is brought to the position shown in FIGURE 4, and is screwed onto bushing 21. This results in bushing 21 being drawn upwardly in aperture 18 to the position shown in FIGURE 3. In this position the outer surface of skirt 22 is in tight engagement with side wall 19, and during tightening of screw-cap 30 the width of the lower part of slot 26 is decreased, as a result of which bushing 21 is drawn into tight gripping engagement with tube 11. It will be appreciated that bushing 21 can only slide upwardly in opening 18 to a limited extent, because of the coaction between the tapered outer surface of skirt 22 and tapered side walls 19. It will be appreciated that key 20 extending into slot 26 performs the function of restraining bushing 21 against rotation within bracket 14 during tightening of screw-cap 30. When bushing 21 is in the position shown in FIGURE 3, tube 11 is held firmly in position by virtue of the gripping action of bushing 21 on tube 11. It is an important feature of this invention that tube 11 will remain in the position shown in FIGURE 3, even if screw-cap 30 is loosened, and even completely disengaged from threads 24 of bushing 21. This is due to the wedging action of bushing 21, and it will be found that it is almost as difficult to pull tube 11 upwardly from the position shown in FIGURE 3 when screw-cap 30 is not engaged with threads 24 as when it is so engaged. In order to free tube 11 from the gripping action of bushing 21 after disengagement of screw-cap 30 from threads 24, it is necessary to impart to tube 11 a sharp downwardly directed force, which has the effect of "breaking the taper" of bushing 21, and returning bushing 21 to the position shown in FIGURE 4 where tube 11 is freely slidable in bracket 14. However, in the absence of such a sharp downwardly directed force, it will be found that tube 11 is supported in position in bracket 14 even if screw-cap 30 becomes loose after having been tightened to the position shown in FIGURE 3 as well may occur as a result of the whole navigation light assembly being subjected to constant vibration.

In order to provide the greatest resistance to longitudinal movement of bushing 21 in opening 18, it is desirable that the whole of the outer surface of skirt portion 22 which is within opening 18 be in contact with tapered sidewalls 19, and, to this end, the whole of the outer surface of skirt portion 22 should be tapered to conform to tapered side walls 19, as is shown in the figures.

It also should be noted that key 20, in addition to serving the function of preventing rotation of bushing 21 in opening 18, provides a stop which limits the upward movement of bushing 21 in opening 18. Thus, when bushing 21 has assumed the position shown in FIGURE 3, the width of slot 26 at the bottom thereof has decreased to such an extent that the side walls defining the slot at the bottom thereof engage key 20 and prevent further upward movement of bushing 21. It will be appreciated, of course, that other means may be employed to prevent rotation of bushing 21 in opening 18.

One important feature of a navigation light employing a holder of the type disclosed herein is the relatively long gripping surface which is provided, as contrasted with the small gripping surface of prior art types of holders provided by the usual plastic washer that is squeezed around the shaft to be held in position, the length of such washer seldom exceeding ⅛ inch. The washer of such a length tends to allow the parts of the shaft above and below the washer to vibrate from side to side which results in loosening of the grip exerted by the small washer. In contrast, bushing 21 preferably has a length in the order of 2 inches which provides a lengthy gripping area. It will be appreciated, however, that bushing 21 may be made shorter is desired.

Another important feature of a preferred embodiment of this invention is that there is no metal-to-metal contact between screw cap 30 and bracket 14, as is best shown in FIG. 3. Additionally there is no metal-to-metal contact between screw cap 30 and tube 11. This is particularly advantageous when a holder embodying this invention is used in locations where salt water may be splashed on the holder, since slight dissimilarities in metals or surfaces tends to create galvanic corrosion at the areas where two or more metal surfaces engage each other. Such galvanic corrosion is avoided when the holder embodying this invention is used where all metal surfaces are kept apart from each other.

A further advantage of a navigation light incorporating a holder of the type disclosed herein is that slot 26 in bushing 21 enables the clearing of salt, sand and other foreign matter from between tube 11 and bushing 21 by the simple expedient of rotating tube 11 relative to bushing 21 when tube 11 is moved up or down. In this manner any foreign matter that may have dried or precipitated in the gripping area of the holder can be cleared to permit free movement of tube 11 without scratching or damaging the surface of tube 11.

While there has been disclosed herein a preferred embodiment of this invention, those skilled in the art will appreciate that changes and modifications may be made therein without departing from the spirit and scope of the invention as defined in the appended claims.

What I claim as my invention is:

1. A navigation light for boats comprising, in combination, a post of generally circular cross-section; illuminating means carried by said post; a mounting bracket adapted to be mounted on a boat and having an opening of tapered cross-section defined by tapered side walls extending therethrough, said mounting bracket having an upstanding neck through which the opening in said bracket extends; a bushing mounted in the opening in said bracket and slidable therein to a limited extent in one direction parallel to the longitudinal axis of the opening in said bracket, said bushing having an outer surface, a part of said outer surface being tapered to conform generally to said tapered side walls and engaging said tapered side walls, said bushing having a threaded neck, said threaded neck projecting beyond said neck of said bracket, said bushing also having an opening of generally circular cross-section extending therethrough and through said threaded neck thereof in the same general direction as the opening in said bracket, said post being mounted in the opening in said bushing, said bushing having a slot therein extending from said outer surface into the opening in said bushing and extending from one end of said bushing to the other end thereof; and a cap member having an opening therethrough which said post extends, said cap member being threadably engageable with said threaded neck of said bushing and adapted to draw said part of said outer surface of said bushing into tight engagement with said tapered side walls defining the opening in said bracket by moving said bushing in said one direction, whereby the width of at least a part of said slot is decreased and said bushing is drawn into tight gripping engagement with said post, said cap member having a skirt portion extending over said neck of said bracket and spaced apart from said neck of said bracket.

2. The invention according to claim 1 in which said slot is wider at said threaded neck of said bushing than at the other end of said bushing and further including a washer positioned between said bracket and said cap member, said washer being of a non-corrosive material, and a member projecting from said side walls into said slot and preventing any substantial degree of rotation of said bushing within said bracket, said bushing also being of non-corrosive material.

References Cited by the Examiner
UNITED STATES PATENTS

| | | | |
|---|---|---|---|
| 308,639 | 12/1884 | Stevens | 287—52.06 X |
| 738,445 | 9/1903 | Hoffmann | 287—52.06 X |
| 929,851 | 8/1909 | Hess | 287—52.06 X |
| 1,726,809 | 9/1929 | Cox | 285—323 |
| 2,554,348 | 5/1951 | Rudolph | 287—52.06 |
| 2,869,237 | 1/1959 | Berge | 287—53 X |
| 2,938,109 | 5/1960 | Coleman | 240—7.5 |

NORTON ANSHER, *Primary Examiner.*